United States Patent [19]

Iizawa

[11] Patent Number: 5,774,457
[45] Date of Patent: Jun. 30, 1998

[54] MULTI-POINT VIDEO CONFERENCE CONTROL APPARATUS

[75] Inventor: Junichi Iizawa, Tokyo, Japan

[73] Assignee: NEC Corporation, Tokyo, Japan

[21] Appl. No.: 751,724

[22] Filed: Nov. 18, 1996

[30] Foreign Application Priority Data

Nov. 21, 1995 [JP] Japan .................................. 7-302650

[51] Int. Cl.$^6$ ..................................................... H04N 7/15
[52] U.S. Cl. ............................. 370/260; 348/15; 379/202
[58] Field of Search .................................... 370/259, 260, 370/261, 262, 263, 265, 266; 379/201, 202, 203, 204, 205; 348/205; 455/518, 519; 395/202

[56] References Cited

U.S. PATENT DOCUMENTS

| 5,444,477 | 8/1995 | Yamadera et al. ........................ 348/15 |
| 5,446,491 | 8/1995 | Shibata et al. ........................... 348/15 |
| 5,548,591 | 8/1996 | Horikoshi ................................ 379/202 |
| 5,604,738 | 2/1997 | Shibata et al. .......................... 370/264 |
| 5,638,114 | 6/1997 | Hatanaka et al. ........................ 348/15 |
| 5,684,527 | 11/1997 | Terui et al. .............................. 348/15 |
| 5,689,641 | 11/1997 | Ludwig et al. .......................... 370/260 |
| 6,575,374 | 10/1997 | Kohda ..................................... 348/15 |

FOREIGN PATENT DOCUMENTS 1117486  5/1989  Japan .
2274084 11/1990  Japan .

Primary Examiner—Chi H. Pham
Assistant Examiner—Ricky Q. Ngu
Attorney, Agent, or Firm—Sughrue, Mion, Zinn, Macpeak & Seas, PLLC

[57] ABSTRACT

In a multi-point video conference control apparatus, a chairman demultiplexer separates video and speech signals from a multiplexed signal from a chairman CODEC. A talker demultiplexer separates video and speech signals from a selected multiplexed signal. A detecting section detects a talk request signal. A first selection instructing section instructs a first selector to select one multiplexed signal on the basis of a detected talk request signal. A second selection instructing section instructs an image selector to select the video signal from the talker demultiplexer upon detection of no talk request signal, and instructs the image selector to select the video signal from the chairman demultiplexer upon detection of no talk request signal. A multi-address calling multiplexer multiplexes the video signal from the image selector and the speech signal from a speech adder. A distribution unit transmits a signal based on the signal from the chairman CODEC to the entrant CODEC as the talk request source and transmits the multiplexed signal from the multi-address calling multiplexer to the remaining entrant CODECs upon detection of a talk request signal, and transmits the multiplexed signal from the multi-address calling multiplexer to all the entrant CODECs upon detection of no talk request signal.

8 Claims, 4 Drawing Sheets

MULTI-POINT VIDEO CONFERENCE CONTROL APPARATUS

BACKGROUND OF THE INVENTION

The present invention relates to a multi-point video conference control apparatus for holding a video conference between multiple points and, more particularly, to a multi-point video conference control apparatus in which one of the stations at multiple points is a station for the chairman.

A video conference is held between participants in remote places through terminal stations having cameras, microphones, and monitor TVs and connected to each other through communication lines. A so-called point-to-multi-point system is a typical example of such TV conference systems. This system is constituted by a center station having a central function and other terminal stations. In the center station, pictures from all the terminal stations can be seen at the same time or alternately. In each terminal station, however, only a picture from the center station can be seen. Speech data from all the stations are added and synthesized to be transmitted by mulli-address calling.

In such a system, since only a picture from the center station can be seen in each terminal station, the feeling of being in the conference is lost while a person at a terminal station other than the center station is talking. For this reason, some improved video conference system is designed to transmit a picture from a terminal station to the remaining terminal stations.

In this video conference system, a picture from a terminal station to which a talker at present belongs is transmitted to all the remaining terminal stations. In addition, speech data from all the terminal stations are added and synthesized to be transmitted to all the terminal stations by multi-address calling. In this video conference system, the multi-point video conference control apparatus as the center station performs switching of pictures to be transmitted to the respective terminal stations and addition and multi-address calling of speech data. That is, this apparatus has a function of managing the overall operation of the video conference system.

The respective terminal stations are bidirectionally connected to the multi-point video conference control apparatus through communication lines. Video and speech data are generally multiplexed to be transmitted/received. The multi-point video conference control apparatus separates multiplexed signals received from the respective terminal stations into video and speech data in units of points, and selects video data, from the video data transmitted from these terminal stations, which are to be returned to the respective terminal stations. The apparatus also adds and synthesizes all the separated speech signals. The apparatus then multiplexes the selected video signals and the synthetic speech signal again, and transmits the resultant signals to the respective terminal stations. Such a multi-point video conference control apparatus is specified by ITU-T Recommendation H. 231.

Japanese Patent Laid-Open No. 1-117486 discloses a multi-point video conference control apparatus designed to transmit a video signal from a terminal station to which a talker at present belongs to the remaining terminal stations through a FIFO (First-In First-Out) memory. In order to transmit a picture of the talker to the remaining terminal stations, the video signal transmitted from the station to which the talker belongs must be distributed to the center station and the remaining terminal stations. In general, a speech or video signal is converted into a digital signal, and is encoded to be compressed according to a predetermined algorithm when it is to be transmitted through a communication line. For this reason, the signal representing the talker must be distributed to two encoding circuits having different clock timings for the center station and the remaining terminal stations. According to the prior art, the signal from the terminal station to which the talker belongs is transmitted to each terminal station to which a participant other than the talker at present belongs through the FIFO memory to absorb the difference between the clock timings.

Japanese Patent Laid-Open No. 2-274034 discloses a multi-point video conference control apparatus in which when the picture to be transmitted to the respective terminal stations by multi-address calling is to be switched, the picture before switching is frozen and held in each terminal station until the picture after switching is prepared. This apparatus separates multiplexed signals from the respective terminal stations into video and speech signals, and adds and synthesizes the speech signals from all the stations. The encoded data as the video signal from each terminal station is directly transmitted to the remaining terminal stations without being decoded by the decoder or encoded by the encoder. In this case, since the picture before switching is frozen until the picture after switching is prepared, there is no interruption between the pictures when they are switched.

Such a multi-point video conference control apparatus includes demultiplexers and multiplexers in correspondence with the respective terminal stations. The demultiplexers separate the multiplexed signals received from the respective terminal stations into speech and video signals. The multiplexers multiplexes the speech and video signals to be transmitted to the terminal stations. As the number of accommodation points increases, the number of circuits for separating and multiplexing signals increases. When a large-scale system is to be constructed, the multi-point video conference control apparatus has a large circuit, and the cost of the apparatus increases.

SUMMARY OF THE INVENTION

It is an object of the present invention to provide a multi-point video conference control apparatus which allows installation of many terminal stations with a small circuit scale.

In order to achieve the above object, according to the present invention, there is provided a multi-point video conference control apparatus comprising first signal separation means for separating a multiplexed signal transmitted from a specific first terminal station into video and speech signals, first multiplexed signal selection means for selecting one of multiplexed signals transmitted from a plurality of second terminal stations other than the first terminal station, second signal separation means for separating the multiplexed signal selected by the first multiplexed signal selection means into video and speech signals, speech signal addition means for adding the speech signals output from the first and second signal separation means, video signal selection means for selecting one of the video signals output from the first and second signal separation means, talk request signal detection means for detecting a talk request signal indicating a talk request transmitted from the second terminal station, first selection instructing means for, when a talk request signal is detected, instructing the first multiplexed signal selection means to select a multiplexed signal from one of the second terminals which is a talk request source on the basis of the detected talk request signal, second selection instructing means for instructing the video signal selection means to select a video signal from the second signal separation means when a talk request signal is detected, and instructing the second selection instructing means to select a video signal from the first signal separation means when no talk request signal is detected by the talk request signal detection means, first signal multiplexing means for multiplexing the video signal selected by the video signal selection means and the speech signal output from the speech addition means, and signal distribution means for, when a talk request signal is detected, transmitting a signal based on the multiplexed signal transmitted from the first terminal station to one of the second terminal stations which is the talk request source, and transmitting the multiplexed signal from the first signal multiplexing means to the second terminal stations other than the talk request source, and when a talk request signal is not detected by the talk request signal detection means, transmitting the multiplexed signal from the first signal multiplexing means to all the second terminal stations.

DESCRIPTION OF THE PREFERRED EMBODIMENTS

Figure 1:
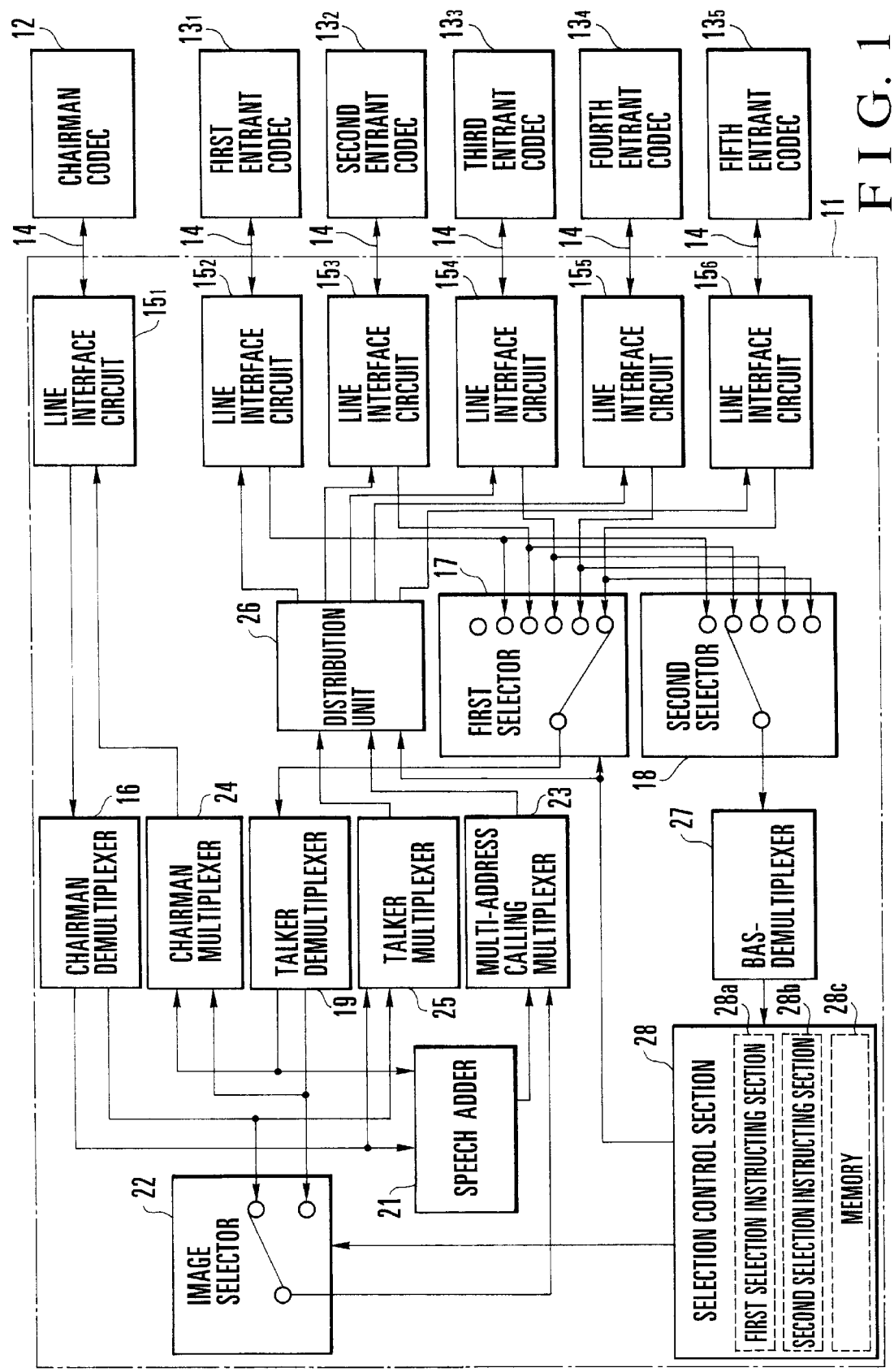
FIG. 1 is a block diagram showing a multi-point video conference control apparatus according to the first embodiment of the present invention.

FIG. 1 shows the schematic arrangement of a multi-point video conference control apparatus according to the first embodiment of the present invention. A chairman CODEC (coder-decoder) 12 installed for the chairman of a conference and first to fifth entrant CODECs $13_1$ to $13_5$ installed for the participants other than the chairman are connected to a multi-point video conference control apparatus 11 through communication lines 14. Each of the chairman CODEC 12 and the first to fifth entrant CODECs $13_1$ to $13_5$ serves as a conference terminal and has a camera, a microphone, a monitor TV, a loudspeaker, and the like.

In general, in a video conference, a specific CODEC serves as a chairman CODEC, and a picture from the chairman CODEC is transmitted to the CODECs other than the chairman CODEC except when a participant at a CODEC other than the chairman CODEC talks. When a participant at a CODEC other than the chairman CODEC talks to ask a question or answer a question, a picture from the entrant CODEC to which the talker belongs is transmitted to the remaining entrant CODECs and the chairman CODEC.

In this embodiment, when, for example, the participant at the entrant CODEC $13_1$ is to talk, the multi-point video conference control apparatus 11 selects video and speech data from the entrant CODEC $13_1$ to which the talker belongs (to be referred to as a talker CODEC hereinafter), and transmits the selected data to the remaining entrant CODECs $13_2$ to $13_5$ and the chairman CODEC 12. The apparatus transmits video and speech data from the chairman CODEC 12 to the entrant CODEC $13_1$. While there is no speech from the entrant CODECs $13_1$ to $13_5$, video and speech data from the chairman CODEC 12 are transmitted to all the entrant CODECs $13_1$ to $13_5$.

The multi-point video conference control apparatus 11 includes line interface circuits $15_1$ to $15_6$ in correspondence with the respective CODECs to receive multiplexed signals obtained by multiplexing video and speech data, which are transmitted from the respective CODECs 12 and $13_1$ to $13_5$ through the communication lines 14, and to transmit multiplexed signals to the respective CODECs 12 and $13_1$ to $13_5$. Each signal transmitted/received through the communication line 14 is obtained by multiplexing speech and video signals. In addition to these signals, a control signal for transmitting information indicating an encoding algorithm or the presence/absence of a talk request is multiplexed.

The multiplexed signal from the chairman CODEC 12 is input to a chairman demultiplexer 16 through the line interface circuit $15_1$. The chairman demultiplexer 16 is a circuit for separating the multiplexed signal into video and speech signals. The multiplexed signals transmitted from the entrant CODECs $13_1$ to $13_5$ are distributed and input to first and second selectors 17 and 18 through the line interface circuits $15_2$ to $15_6$. The first selector 17 is a switching circuit for selecting only one of the multiplexed signals transmitted from the entrant CODECs $13_1$ to $13_5$ which corresponds to the entrant CODEC selected as a talker CODEC. When there is no talker, the first selector 17 is switched to be connected to no entrant CODEC.

The multiplexed signal from the talker CODEC selected by the first selector 17 is input to a talker demultiplexer 19. The talker demultiplexer 19 is a circuit for separating the multiplexed signal from the talker CODEC into video and speech signals. The speech signal separated by the talker demultiplexer 19 and the speech signal separated by the chairman demultiplexer 16 are input to a speech adder 21, which adds and mixes them.

The video signal separated by the talker demultiplexer 19 and the video signal separated by the chairman demultiplexer 16 are input to an image selector 22. The image selector 22 is a circuit for selecting one of the video signals. The video signal selected by the image selector 22 and the speech signal obtained by the speech adder 21 are input to a multi-address calling multiplexer 23, which multiplexes these signals.

Both the speech and video signals separated by the talker demultiplexer 19 are also input to a chairman multiplexer 24. The multiplexed signal output from the chairman multiplexer 24 is transmitted to the chairman CODEC 12 through the line interface circuit $15_1$. Both the speech and video signals separated by the chairman demultiplexer 16 are also input to a talker multiplexer 25. Both the multiplexed signal multiplexed by the talker multiplexer 25 and the multiplexed signal output from the multi-address calling multiplexer 23 are input to a distribution unit 26.

The distribution unit 26 is a circuit for selectively distributing the outputs from the multi-address calling multiplexer 23 and the talker demultiplexer 19 to a plurality of entrant CODECs. When any one of the entrant CODECs is selected as a talker CODEC, the signal from the chairman CODEC 12, which is multiplexed by the talker multiplexer 25, is transmitted to the talker CODEC. The multiplexed signal from the multi-address calling multiplexer 23 is transmitted to the remaining entrant CODECs other than the talker CODEC. When no entrant CODEC is selected as a talker CODEC, the signal from the talker multiplexer 25, i.e., the video and speech data from the chairman CODEC 12, is distributed to all the entrant CODECs.

The second selector 18 alternately selects a plurality of multiplexed signals transmitted from the first to fifth entrant CODECs $13_1$ to $13_5$ one by one at predetermined time intervals. The multiplexed signal selected by the second selector 18 is input to a BAS (bit allocation signal)-demultiplexer 27. The BAS-demultiplexer 27 is a circuit for separating a control signal from the multiplexed signal to extract a BAS command representing the presence/absence of a talk request. The BAS command is a command defined by the extension procedure based on ITU-T Recommendation H. 221.

The BAS command extracted by the BAS-demultiplexer 27 is input to a selection control section 28. The selection control section 28 includes a first selection instructing section 28a for switching the first selector 17 to select the entrant CODEC which has currently generated a talk request, a second selection instructing section 28b for supplying a selection signal to the image selector 22 to cause it to select the video signal from the talker demultiplexer 19 when a talk request is received, and the video signal from the chairman demultiplexer 16 when no talk request is received, and a memory 28c for buffering a talk request by the first-in first-out scheme. The selection control section 28 changes the settings of the distribution unit 26 in accordance with the presence/absence of a talk request.

The operation of the multi-point video conference control apparatus having the above arrangement will be described below.

The second selector 18 constantly and cyclically switches multiplexed signals to be selected to search for a talk request from the first to fifth entrant CODECs $13_1$ to $13_5$. The BAS-demultiplexer 27 separates and extracts a BAS command from the multiplexed signal from each entrant CODEC selected by the second selector 18. The extracted BAS commands are sequentially stored in the memory 28c in the selection control section 28.

Figure 2:
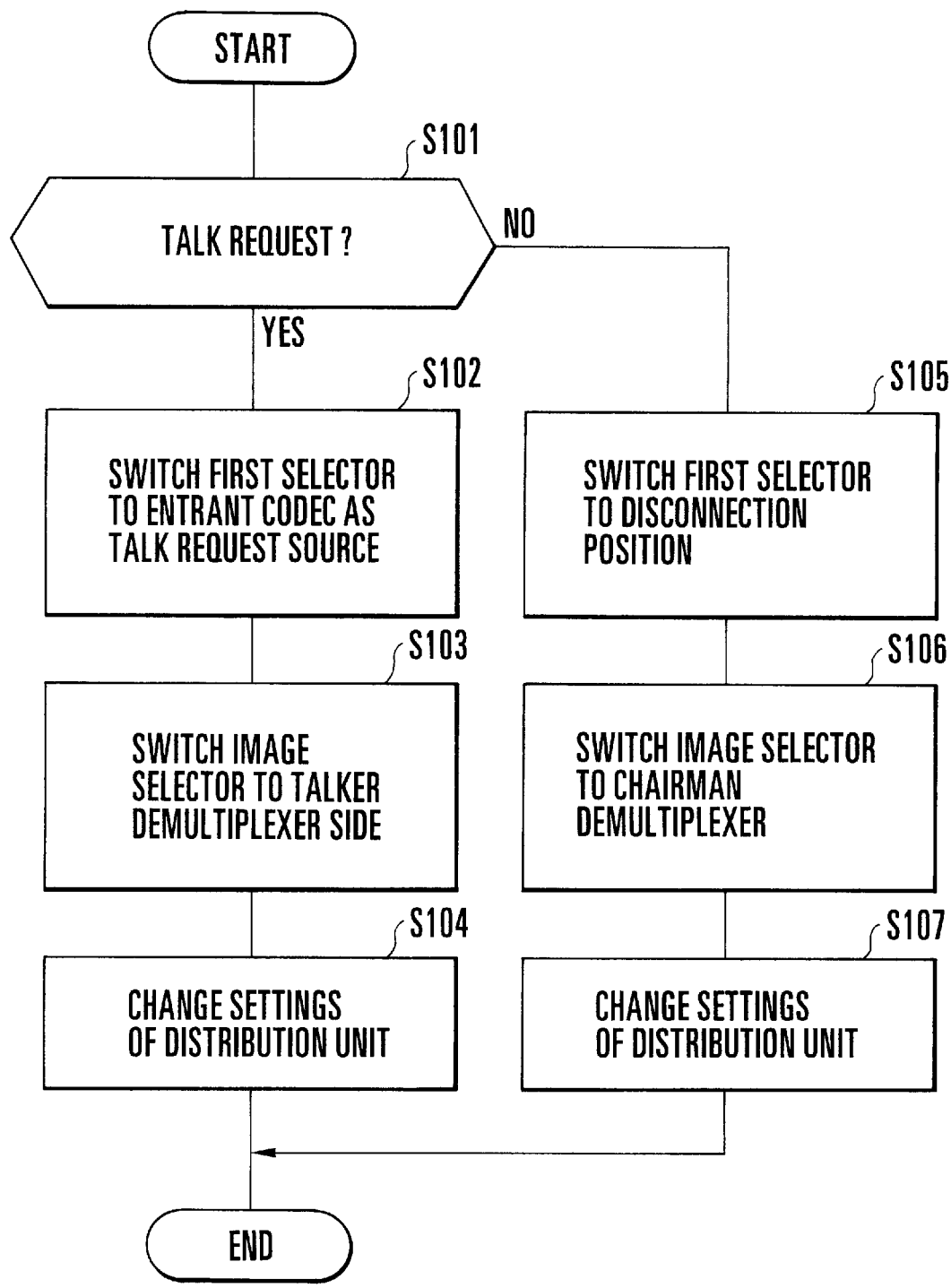
FIG. 2 is a flow chart showing the flow of the operation performed by a selection control section.

FIG. 2 shows the flow of the operation performed by the selection control section 28. The selection control section 28 checks whether the BAS command stored in the memory 28c represents a talk request (step S101). If it is determined in step S101 that the BAS command represents the presence of a talk request, the first selection instructing section 28a of the selection control section 28 switches the first selector 17 to select the multiplexed signal from the entrant CODEC from which the talk request is received first (step S102). If, for example, a talk request is received from the fifth entrant CODEC $13_5$, the selection control section 28 causes the first selector L7 to select the multiplexed signal from the fifth entrant CODEC $13_5$ through the line interface circuit $15_6$. The signal selected by the first selector 17 is input to the talker demultiplexer 19 to be separated into video and speech signals.

Both the video and speech signals separated by the talker demultiplexer 19 are multiplexed again by the chairman multiplexer 24. The multiplexed signal is transmitted to the chairman CODEC 12 through -the line interface circuit $15_1$ and the communication line 14. In this manner, the video and speech data from the entrant CODEC to which the talker at present belongs are transmitted to the chairman CODEC 12. The selection control section 28 switches the first selector 17, and also switches the image selector 22 through the second selection instructing section 28b, thereby selecting the video signal from the talker demultiplexer 19 (step S103). With this operation, the video signal from the talker demultiplexer 19 is input to the multi-address calling multiplexer 23.

The speech signal separated by the talker demultiplexer 19 and the speech signal separated by the chairman demultiplexer 16 are constantly input to the speech adder 21. With this operation, the speech signal from the entrant CODEC to which the talker at present belongs and the speech signal from the chairman CODEC are mixed and input to the multi-address calling multiplexer 23. The multi-address calling multiplexer 23 always multiplexes the mixed speech signal and the video signal from the image selector 22. The selection control section 28 switches the image selector 22 and changes the settings of the distribution unit 26 (step S104). In this case, the distribution unit 26) is set such that the multiplexed signal from the mulli-address calling multiplexer 23 is transmitted to the entrant CODECs other than the entrant CODEC selected as the talker CODEC at present, and the output signal from the talker multiplexer 25 is transmitted to the entrant CODEC selected as the current talker CODEC.

When, for example, the entrant CODEC $13_5$ is selected as a talker CODEC, the multiplexed signal from the multi-address calling multiplexer 23 is distributed to the first to fourth entrant CODECs $13_1$ to $13_4$. In addition, the output signal from the talker multiplexer 25 is transmitted to the fifth entrant CODEC $13_5$. Since the speech and video signals separated by the chairman demultiplexer 16 are constantly multiplexed by the talker multiplexer 25, the video and speech data from the chairman CODEC 12 are transmitted to the talker CODEC.

If it is determined in step S101 that there is no talker request, the first selector 17 is switched to a disconnection position where the selector is connected to no entrant CODEC (step S105). The second selection instructing section 28b of the selection control section 28 switches the image selector 22 to select the video signal from the chairman demultiplexer 16 (step S106). With this operation, the video signal from the chairman CODEC 12 is input to the multi-address calling multiplexer 23. The selection control section 28 changes the settings of the distribution unit 26 such that the signal from the multi-address calling multiplexer 23 is distributed to all the entrant CODECs $13_1$ to $13_5$ (step S107). If, therefore, there is no talker, the video and speech data from the chairman CODEC 12 are transmitted to all the entrant CODECs $13_1$ to $13_5$.

Figure 3:
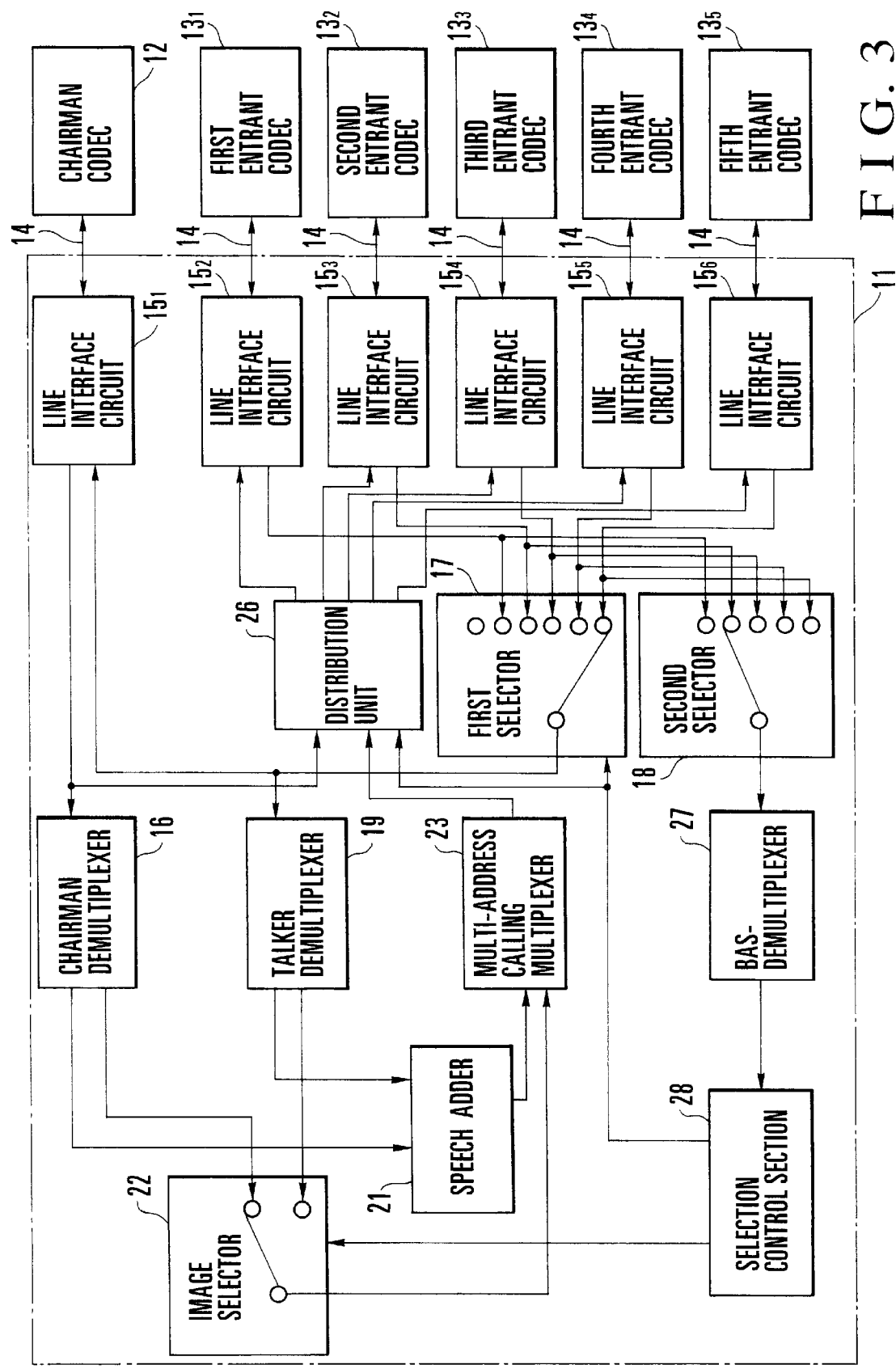
FIG. 3 is a block diagram showing a multi-point video conference control apparatus according to the second embodiment of the present invention.

In the above embodiment, the video and speech signals separated by the talker demultiplexer 19 are multiplexed by the chairman multiplexer 24, and the signal separated by the chairman demultiplexer 16 is multiplexed. These circuits are arranged to multiplex control signals such as BAS commands as well as video and speech signals. When only video and speech signals are to be multiplexed, the chairman multiplexer 24 and the talker multiplexer 25 can be omitted, as shown in FIG. 3. Referring to FIG. 3, a signal from a first selector 17 is distributed and supplied to a talker demultiplexer 19 and a line interface circuit $15_1$ for the chairman CODEC. In addition, the signal from the line interface circuit $15_1$ for the chairman CODEC is distributed and input to a chairman demultiplexer 16 and a distribution unit 26. With this operation, two multiplexers can be omitted, and hence the circuit scale can further be reduced. Note that the same reference numerals in FIG. 3 denote the same parts as in FIG. 1, and a description thereof will be omitted.

Figure 4:
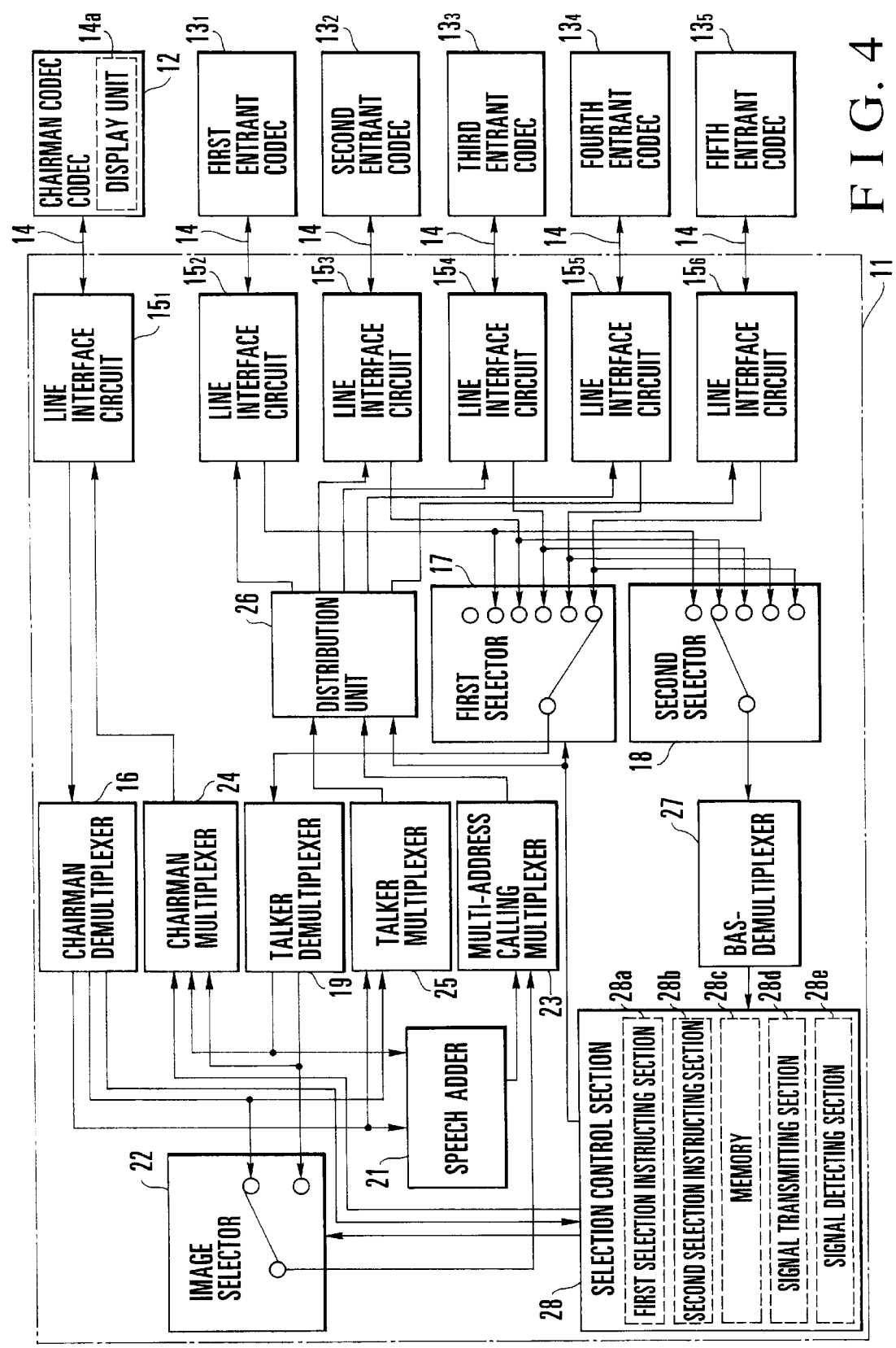
FIG. 4 is a block diagram showing a multi-point video conference control apparatus according to the third embodiment of the present invention.

An entrant CODEC as a talker CODEC can be selected by a chairman CODEC 12. In this case, as shown in FIG. 4, a signal transmitting section 28d of a selection control section 28 transmits, to the chairman CODEC 12 through a chairman multiplexer 24, a signal representing a specific entrant CODEC from which a talker request is received. The chairman CODEC 12 causes a display unit 14a to display the presence/absence of a talker request for each entrant CODEC on the basis of this signal. The chairman sees this display and selects an entrant CODEC to which a permission to talk is given, and transmits, to the selection control section 28 through a chairman demultiplexer 16, a signal representing a specific entrant CODEC to which the permission to talk is given. The selection control section 28 switches a first selector 17, an image selector 22, and a distribution unit 26 in accordance with the instruction from the chairman on the basis of the talk permission signal detected by a signal detecting section 28e. With this operation, pictures corresponding to the progress of the conference which is based on the decision made by the chairman can be transmitted. Note that the same reference numerals in FIG. 4 denote the same parts as in FIG. 1, and a description thereof will be omitted.

This embodiment includes one first selector 17, one second selector 18, and one BAS-demultiplexer 27. When entrant CODECs larger than those which can be accommodated in one selector are to be connected, a plurality of selectors and BAS-demultiplexers may be arranged. In this case, the selection control section receives a talk request by switching one of outputs from the BAS-demultiplexers. The first selector in which the current talker CODEC is accommodated is caused to select the talker CODEC, and the remaining first selectors are switched to disconnection points where they are not connected to any entrant CODECs. This operation prevents collision between multiplexed signals from the plurality of first selectors in the talker demultiplexer.

As described above, according to the present invention, even if separation means for separating multiplexed signals into video and speech signals are not arranged in the respective entrant CODECs, proper pictures can be transmitted to the respective stations. The circuit arrangement of the multi-point video conference control apparatus can be simplified.

If, for example, the first entrant CODEC is the entrant CODEC to which the chairman belongs, the multiplexed signal as the video and speech data of the talker can be transmitted from the talker CODEC to the chairman.

If, for example, the first entrant CODEC is the chairman CODEC, the chairman can recognize an entrant CODEC from which a talker request is output. Since a picture from the step entrant CODEC which is permitted to talk by the chairman is transmitted to the remaining entrant CODECs, pictures corresponding to the progress of a conference which are based on the decision made by the chairman can be transmitted to the respective entrant CODECs.

The multiplexed signals transmitted from the respective entrant CODECs are cyclically and sequentially selected on by one, and a talk request signal is separated from each multiplexed signal. Since this operation requires only one means for separating a talk request signal, the circuit arrangement can be further simplified.

In addition, talk request signals transmitted from the respective entrant CODECs are bufferred, and the signals are sequentially read out in the order in which they are stored. With this operation, operations corresponding to the talk requests are sequentially performed. Therefore, while one entrant CODEC is selected, talk requests from the remaining entrant CODECs can be sequentially received and processed.

What is claimed is:

1. A multi-point video conference control apparatus comprising:

first signal separation means for separating a multiplexed signal transmitted from a specific first terminal station into video and speech signals;

first multiplexed signal selection means for selecting one of multiplexed signals transmitted from a plurality of second terminal stations other than said first terminal station;

second signal separation means for separating the multiplexed signal selected by said first multiplexed signal selection means into video and speech signals;

speech signal addition means for adding the speech signals output from said first and second signal separation means;

video signal selection means for selecting one of the video signals output from said first and second signal separation means;

talk request signal detection means for detecting a talk request signal indicating a talk request transmitted from one of said second terminal stations;

first selection instructing means for, when a talk request signal is detected, instructing said first multiplexed signal selection means to select a multiplexed signal from one of said second terminals which is a talk request source on the basis of the detected talk request signal;

second selection instructing means for instructing said video signal selection means to select a video signal from said second signal separation means when a talk request signal is detected, and instructing said second selection instructing means to select a video signal from said first signal separation means when no talk request signal is detected by said talk request signal detection means;

first signal multiplexing means for multiplexing the video signal selected by said video signal selection means and the speech signal output from said speech addition means; and signal distribution means for, when a talk request signal is detected, transmitting a signal based on the multiplexed signal transmitted from said first terminal station to one of said second terminal stations which is the talk request source, and transmitting the multiplexed signal from said first signal multiplexing means to said second terminal stations other than the talk request source, and when a talk request is not detected by said talk request signal detection means, transmitting the multiplexed signal from said first signal multiplexing means to all said second terminal stations.

2. An apparatus according to claim 1, further comprising second signal multiplexing means for multiplexing the video and speech signals from said first signal separation means and outputting the multiplexed signal to said signal distribution means, and wherein when a talk request signal is detected by said talk request signal detection means, said signal distribution means transmits the multiplexed signal from said second signal multiplexing means to said second terminal station as the talk request source.

3. An apparatus according to claim 1, further comprising second signal multiplexing means for multiplexing the video and speech signals from said second signal separation means and transmitting the multiplexed signal to said first terminal station.

4. An apparatus according to claim 1, further comprising:

signal transmission means for transmitting a talk request station display signal, indicating one of said second terminal stations which is the talk request source, on the basis of the detection result obtained by said talk request signal detection means to said first terminal station; and signal detection means, responsive to transmission of a talk request station display signal, for detecting a talk permission signal indicating one of said second terminal stations which is permitted to talk and transmitted from said first terminal station.

5. An apparatus according to claim 1, wherein the talk request signal is multiplexed with the multiplexed signal transmitted from said second terminal station, and said talk request signal detection means comprises second multiplexed signal selection means for cyclically and sequentially selecting multiplexed signals transmitted from said second terminal stations, and third signal separation means for separating a talk request signal from the multiplexed signal selected by said second multiplexed signal selection means.

6. An apparatus according to claim 1, further comprising a memory for storing talk request signals transmitted from said second terminal stations in the order in which the signals are detected, and wherein said talk request signal detection means reads out the talk request signals stored in said memory in the order in which the signals are stored, thereby detecting arrival of the talk request signals in the order in which the signals are read out.

7. An apparatus according to claim 1, further comprising selection control means, having said first and second selection instructing means, for controlling said signal distribution means in accordance with the presence/absence of a talk request signal detected by said talk request signal detection means and setting destinations to which a signal based on a multiplexed signal from said first signal multiplexing means and a signal based on a multiplexed signal from said first terminal station are to be distributed.

8. A multi-point video conference control apparatus comprising:

first signal separation means for separating a multiplexed signal transmitted from a specific first terminal station into video and speech signals;

first multiplexed signal selection means for selecting one of multiplexed signals transmitted from a plurality of second terminal stations other than said first terminal station;

second signal separation means for separating the multiplexed signal selected by said first multiplexed signal selection means into video and speech signals;

speech signal addition means for adding the speech signals output from said first and second signal separation means;

video signal selection means for selecting one of the video signals output from said first and second signal separation means;

second signal multiplexing means for multiplexing the video and speech signals from said second signal separation means and transmitting the multiplexed signal to said first terminal station;

third signal multiplexing means for multiplexing the video and speech signals from said first signal separation means and outputting the multiplexed signal to said signal distribution means;

talk request signal detection means for detecting a talk request signal indicating a talk request transmitted from said second terminal station;

first selection control means for, when a talk request signal is detected, selecting a multiplexed signal from one of said second terminals which is a talk request source on the basis of the detected talk request signal by controlling said first multiplexed signal selection means;

second selection control means for selecting one of the video signals from said first and second signal separation means which are output to said first signal multiplexing means, by controlling said video signal selection means on the basis of the presence/absence of a talk request signal detected by said talk request signal detection means;

first signal multiplexing means for multiplexing the video signal selected by said video signal selection means and the speech signal output from said speech addition means;

signal distribution means for distributing the multiplexed signals from said first and third signal multiplexing means to said second terminal stations; and third selection control means for controlling said signal distribution means on the basis of the presence/absence of a talk request signal, said third selection control means transmitting the multiplexed signal from said third signal multiplexing means to one of said second terminal stations which is a talk request source and transmitting the multiplexed signal from said first signal multiplexing means to said second terminal stations other than the talk request source when a talk request signal is detected, and transmitting the multiplexed signal from said first signal multiplexing means to all said second terminal stations when a talk request signal is not detected.

* * * * *